United States Patent
Gschwind et al.

(10) Patent No.: US 7,222,332 B2
(45) Date of Patent: May 22, 2007

(54) METHOD AND APPARATUS FOR OVERLAY MANAGEMENT WITHIN AN INTEGRATED EXECUTABLE FOR A HETEROGENEOUS ARCHITECTURE

(75) Inventors: Michael Karl Gschwind, Chappaqua, NY (US); Kathryn M. O'Brien, South Salem, NY (US); John Kevin O'Brien, South Salem, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/280,242

(22) Filed: Oct. 24, 2002

(65) Prior Publication Data

US 2004/0083455 A1 Apr. 29, 2004

(51) Int. Cl.
*G06F 9/44* (2006.01)
*G06F 9/30* (2006.01)

(52) U.S. Cl. .................... 717/107; 712/203
(58) Field of Classification Search ........... 717/120, 717/140, 151, 106; 711/132; 709/203
See application file for complete search history.

(56) References Cited

U.S. PATENT DOCUMENTS

| | | |
|---|---|---|
| 4,882,674 A | 11/1989 | Quint et al. |
| 5,339,430 A | 8/1994 | Lundin et al. |
| 5,659,701 A | 8/1997 | Amit et al. |
| 5,664,159 A | 9/1997 | Richter et al. |
| 5,684,955 A | 11/1997 | Meyer et al. |
| 5,761,137 A | 6/1998 | Johnson et al. |
| 5,812,848 A | 9/1998 | Cohen |
| 5,960,466 A | 9/1999 | Belgard |
| 6,006,248 A | 12/1999 | Nagae |
| 6,077,312 A | 6/2000 | Bates et al. |
| 6,119,247 A | 9/2000 | House et al. |

(Continued)

FOREIGN PATENT DOCUMENTS

JP 11-069785 3/1999

(Continued)

OTHER PUBLICATIONS

Orr et al., "OMOS—An Object Server for Program Execution", © 1992, IEEE, p. 200-209.

(Continued)

*Primary Examiner*—Wei Zhen
*Assistant Examiner*—Chih-Ching Chow
(74) *Attorney, Agent, or Firm*—Carr LLP; D'Ann Rifai

(57) ABSTRACT

The present invention provides for creating and employing code and data partitions in a heterogeneous environment. This is achieved by separating source code and data into at least two partitioned sections and at least one unpartitioned section. Generally, a partitioned section is targeted for execution on an independent memory device, such as an attached processor unit. Then, at least two overlay sections are generated from at least one partition section. The plurality of partition sections are pre-bound to each other. A root module is also created, associated with both the pre-bound plurality of partitions and the overlay sections. The root module is employable to exchange the at least two overlay sections between the first and second execution environments. The pre-bound plurality of partition sections are then bound to the at least one unpartitioned section. The binding produces an integrated executable.

36 Claims, 6 Drawing Sheets

U.S. PATENT DOCUMENTS

| | | | |
|---|---|---|---|
| 6,138,209 | A | 10/2000 | Krolak et al. |
| 6,145,119 | A | 11/2000 | House et al. |
| 6,157,960 | A | 12/2000 | Kaminsky et al. |
| 6,202,200 | B1 | 3/2001 | House et al. |
| 6,209,061 | B1 * | 3/2001 | Nelson et al. ............. 711/132 |
| 6,219,803 | B1 | 4/2001 | Casella et al. |
| 6,427,234 | B1 * | 7/2002 | Chambers et al. .......... 717/140 |
| 6,430,600 | B1 | 8/2002 | Yokote |
| 6,446,137 | B1 | 9/2002 | Vasudevan et al. |
| 6,480,818 | B1 | 11/2002 | Alverson et al. |
| 6,526,491 | B2 | 2/2003 | Suzuoki et al. |
| 6,542,926 | B2 * | 4/2003 | Zalewski et al. ........... 709/213 |
| 6,671,746 | B1 | 12/2003 | Northrup |
| 6,704,842 | B1 | 3/2004 | Janakiraman et al. |
| 6,735,601 | B1 | 5/2004 | Subrahmanyam |
| 6,738,977 | B1 | 5/2004 | Berry et al. |
| 6,760,907 | B2 | 7/2004 | Shaylor |
| 6,779,049 | B2 | 8/2004 | Altman et al. |
| 2002/0078308 | A1 | 6/2002 | Altman et al. |
| 2002/0144241 | A1 | 10/2002 | Lueh |
| 2004/0205697 | A1 * | 10/2004 | Hylands et al. ............. 717/106 |

FOREIGN PATENT DOCUMENTS

| | | |
|---|---|---|
| JP | 2000-032743 | 1/2000 |

OTHER PUBLICATIONS

"Chapter 7: Linking", © 1998 Micro Focus Limited, p. 1-11.

Winner, "Naming and Binding in a Vertical Migration Environment", © 1988 IEEE, p. 599-607.

Implementing a component architecture on multiple distributed object frameworks—Ben-Shaul, I.; Gish, J.W.; Robinson, W.; Enterprise Distributed Object Computing Workshop, 1998. EDOC '98. Proceedings. Second International, Nov. 3-5, 1998; pp. 319-329.

Experience with secure multi-processing in Java—Balfanz, D.; Distributed Computing Systems, 1998. Proceedings. 18th International Conference on, May 26-29, 1998; pp. 398-405.

A toolkit for detecting and analyzing malicious software—Weber, M.; Schatz, M.; Geyer, D.; Computer Security Applications Conference, 2002. Proceedings. 18th Annual, Dec. 9-13, 2002; pp. 423-431.

Debugging protocol for remote cross development environment—Seungwoo Son; Chaedeok Lim; Neung-Nam Kim; Real-Time Computing Systems and Applications, 2000. Proceedings. Seventh International Conference on. Dec. 12-14, 2000; pp. 394-398.

Reflections on remote reflection—Richmond, M.; Noble, J.; Computer Science Conference, 2001. ACSC 2001. Proceedings. 24th Australasian, Jan. 29-Feb. 4, 2001; pp. 163-170.

Tanenbaum, "Structured Computer Organization", 1984, Prentice-Hall, Inc., p. 10-12.

* cited by examiner

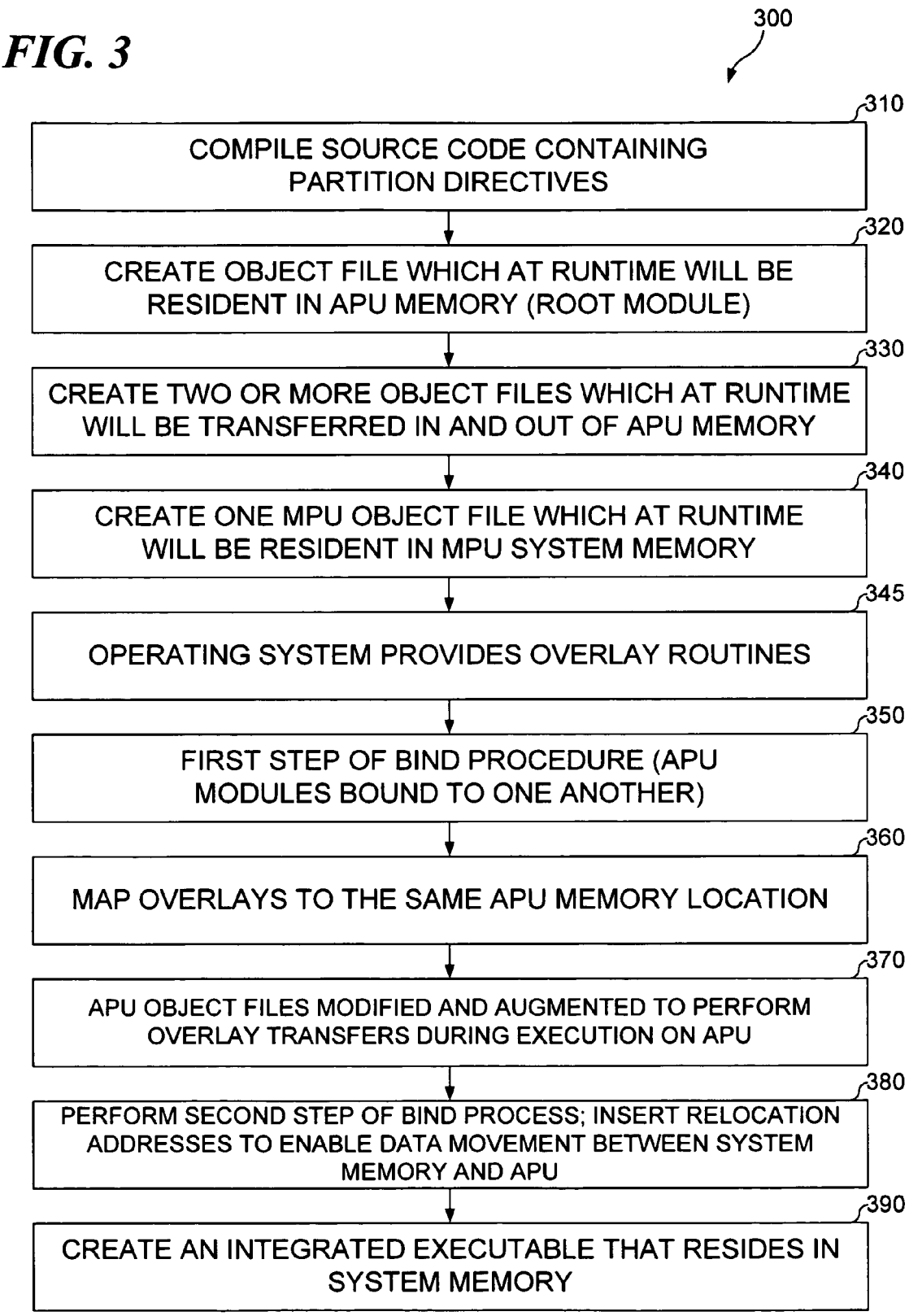

METHOD AND APPARATUS FOR OVERLAY MANAGEMENT WITHIN AN INTEGRATED EXECUTABLE FOR A HETEROGENEOUS ARCHITECTURE

CROSS-REFERENCE TO RELATED APPLICATIONS

This application relates to co-pending U.S. patent applications entitled "METHOD AND APPARATUS FOR SETTING BREAKPOINTS WHEN DEBUGGING INTEGRATED EXECUTABLES IN A HETEROGENEOUS ARCHITECTURE" (application Ser. No. 10/280,677, "METHOD AND APPARATUS FOR ENABLING ACCESS TO GLOBAL DATA BY A PLURALITY OF CODES IN AN INTEGRATED EXECUTABLE FOR A HETEROGENEOUS ARCHITECTURE" (application Ser. No. 10/280,187, "METHOD AND APPARATUS FOR MAPPING DEBUGGING INFORMATION WHEN DEBUGGING INTEGRATED EXECUTABLES IN A HETEROGENEOUS ARCHITECTURE" (application Ser. No. 10/280,243, and "METHOD AND APPARATUS FOR CREATING AND EXECUTING INTEGRATED EXECUTABLES IN A HETEROGENEOUS ARCHITECTURE" (application Ser. No. 10/280,244, filed concurrently herewith and having the same inventors, John Kevin O'Brien, Kathryn M. O'Brien, Michael Karl Gschwind, and Valentina Salapura.

TECHNICAL FIELD

The invention relates generally to multiprocessing and, more particularly, to managing overlays in a plurality of processors through employment of a root module.

BACKGROUND

Parallel processing, which generally comprises employing a plurality of microprocessors coupled to the same system to concurrently process a batch of data, is of great importance in the computer industry. Generally, there are three major types of parallel processing. These are parallel processing systems employing shared memory or distributed memory or a combination of the two. Typically, shared memory is memory that can be accessed in a single operation, such as a "load" or "read" command, by a plurality of processors. Distributed memory is memory that is localized to an individual processor. In other words, each processor can access its own associated memory in single access operation, but typically cannot access memories associated with other processors in a single operation. Finally, there is a hybrid, or "heterogeneous," parallel processing, in which there is some shared memory and some memory which is distributed.

One such example of a hybrid parallel processor system comprises a reduced instruction set (RISC) main processor unit (MPU), such as a PowerPC™ processor, and a specialized, or "attached" processor unit (APU), such as a Synergistic™ processor unit (SPU). Typically, the MPU is employed to execute general purpose code, wherein the general purpose code comprises complex control flows and orchestrating the overall hybrid parallel processing function. The MPU has access to the full range of system memory. Although in one embodiment, only one MPU is used, in other embodiments, more than one MPU is used. The APU is generally directed to executing dataflow operations. In other words, the APU calculates highly repetitive multimedia, graphics, signal, or network processing workloads which are identified by high compute to control decision ratios. In conventional hybrid systems, APUs do not have direct access to the system memory, and their own memory, the local store, is typically significantly smaller than the shared memory.

Generally, while employment of the hybrid system provides high computational performance, it poses significant challenges to the programming model. One such problem relates to the APU. The APU cannot directly address system memory. Therefore, any code to be run on the APU has to be transferred to an associated local storage of the APU before this code can be executed on the APU. Another significant challenge presented by such a hybrid system is that the main and attached processors may have distinct instruction sets and micro architectures.

One problem in managing program execution in an APU is that the code and data in the APU can exist in the same, limited size, unpartitioned local memory of the APU, thereby leading to information manipulation issues. Also, functions that execute in the APU, after having been invoked from the MPU, can frequently need to access common, or "shared," data sections and to execute other common, or shared, subroutines. Finally, the code destined to execute in an APU could be larger than can reasonably fit in the memory of the APU.

One component in extracting performance from a computer architecture such as described above, is the creation of an optimum partitioning between code and data. Such a partition should facilitate code and data reuse, and hence minimize data transfer. An efficient partitioning of code, allows for the execution of programs that would otherwise be too large to fit in the local memory of the APU. However, in heterogeneous systems such as described, other problems can arise implementing this efficient partitioning of code. The small memory size of the APU means that often, a particular function, targeted to the APU, can result in an APU code stream which is in fact too large to execute efficiently on the APU.

In one embodiment, multiple APU functions are employed to cooperate on a single problem through the, potentially extensive, sharing and reuse, of various code and data sections within the single combined binary. A naive memory management scheme has the potential in such cases to result in significant performance inefficiencies in terms of both time and space. Typically, this is because there can be multiple copies of the code and data for each targeted APU function, residing in the combined binary in the MPU system memory. Moreover, this conventional approach requires significant overhead in memory transfer, since multiple instances of pre-bound APU modules can obtain identical copies of shared APU code and data. This can slow memory traffic considerably, and may introduce unnecessary delays in processing in the APU local store.

Therefore, memory management is required, which will operate in a heterogeneous architecture and overcome the deficiencies of conventional memory management.

SUMMARY

The present invention employs overlay management in a heterogeneous computing network. Code is transferred from a first execution environment to a second execution environment. Shared data is transferred from the first execution environment to the second execution environment. The shared data is processed in the second execution environment. The code in the second execution environment is overlaid with other code from the first execution environment. However, the shared data is not overlaid with other data from the first execution environment. The shared data in the second execution environment is processed through employment of overlaying new code.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 3 illustrates a method for generating an integrated executable comprising a root module and overlay modules;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
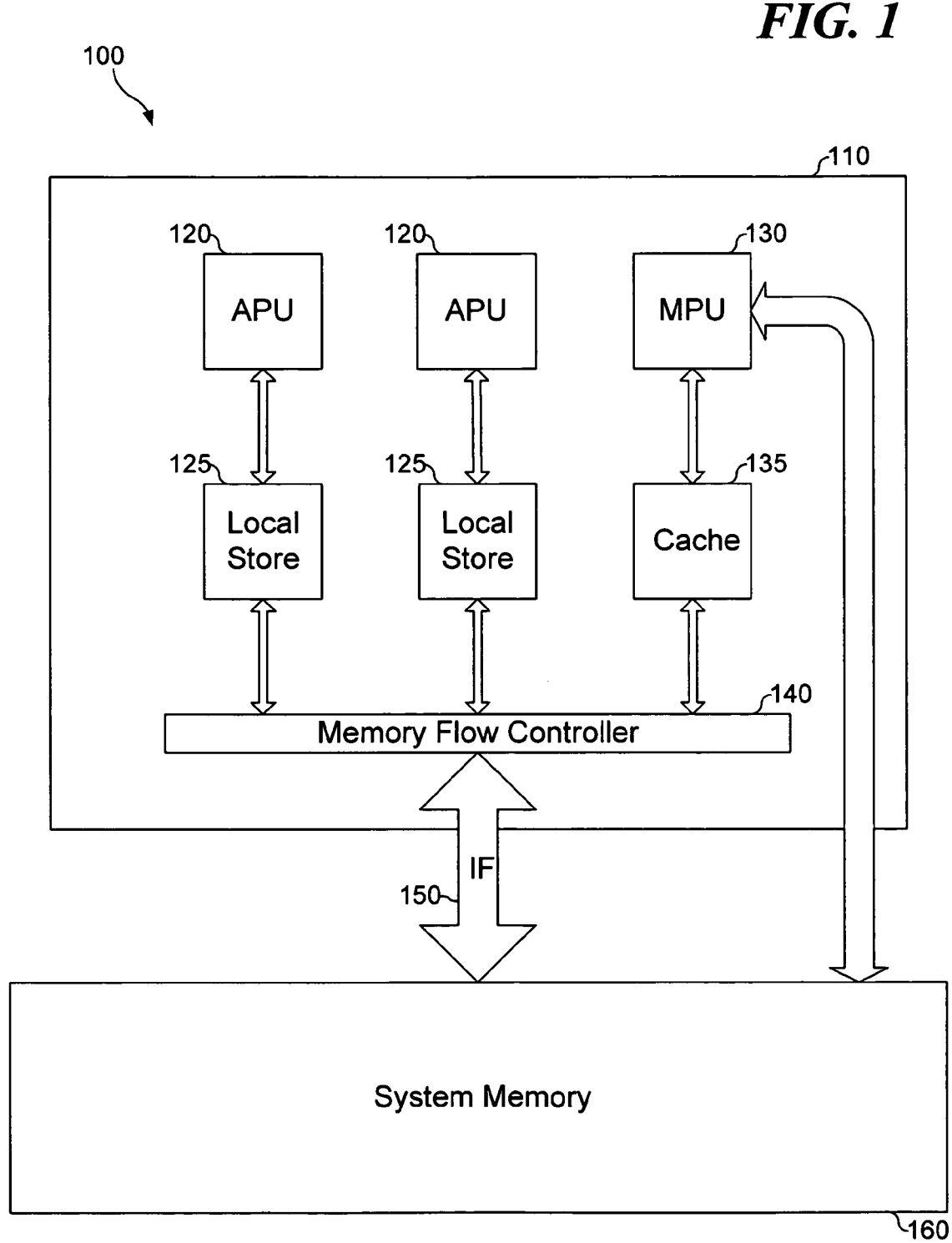
FIG. 1 schematically depicts a hybrid parallel processing environment for creating and managing code and data overlays in a heterogeneous parallel processing environment.

Referring to FIG. 1, the reference numeral 100 generally designates heterogeneous parallel processing architecture that provides an environment for creating and managing code and data overlays from within an integrated executable. The architecture 100 comprises distributed computing environment 110 and a shared system memory 160, both of which are electrically coupled by an interface 150. The environment 110 comprises a plurality of attached processors 120, each with its respective local store 125. The distributed computing system 100 further comprises a main processor 130, such as an RISC processor and its level one cache 135. In one embodiment, the attached processor unit comprises an SPU. In one embodiment, a single MPU 130 is employed. In a further embodiment, a plurality of MPUs 130 are employed.

The environment 110 further comprises a memory flow controller (MFC) 140. Generally, the MFC 140 enables the movement of data and synchronization capability between the MPU 130 and the APU 120 processors, and provides for data transfer between the main system memory 160 and the local store 125.

The MFC 140 enables the movement of information, both text (that is, code) and data between the shared memory 160 and the local store 125 of the APU 120, at the request of the main processor 130 or the APU 120. Because the APU 120 does not have direct access to the system memory 160, the MFC 140 transfers information between the shared memory 160 and the local store 125 of the APU 120, at the request of a transfer function, such as stub function, running on either the APU 120 or the MPU 130. In one embodiment, the MFC 140 comprises a direct memory access (DMA) device.

Generally, the architecture 100 is an environment in which an executable program runs, wherein the executable program comprises modules loadable to the local store 125. Furthermore, the executable program comprises a root module. The root module manages the modules bound to each other by the linker and the shared data, and ensures that the shared data is accessible by various loaded modules, and not overwritten when loading modules into the local store 125. In other words, the root module is employable to ensure that the shared data is not overwritten by an overlay section. Generally, an overlay section is a section that overwrites a previously stored section of information in the local store 125. Typically, the root module resides in the local store 125 of the APU 120 and is not overwritten by an overlay.

Generally, the root module defines a memory address value for shared data. Each module loaded into the local store 125 can access and modify the shared data. However, the root module is employable to ensure that the loaded module does not overwrite the shared data, even when loading a new module to the local store 125.

Generally, in overlay management as employed in the environment 100, a module originally targeted to be loaded into the local store 125 of a targeted APU 120 is split into a plurality of sections. This splitting into sections can occur during compiling or during linking, and generally under the guidance of the programmer. In one embodiment, the sections encapsulate temporal locality. In other words, the sections are accessed repeatedly in a "short" period of time, thus creating spatial locality for the code (that is, code that is accessed frequently is proximate) in the module. These split modules are then bound to one another by the linker to produce modules employable in a local store 125.

Typically, a root module containing those code or data sections used most often is created, and targeted to a local store 125. The binder also maps non-resident portions of the code destined for the local store 125 (that is, the part of the code or data that is not so often used) so that the non-resident portions would occupy the same memory locations. In other words, the non-resident portions can overlay each other. The root module is augmented with calls to the overlay manager to fetch and dispose of the various overlay sections as needed.

Data that is deemed to be referenced (read from and written to) by a multiplicity of either APU functions, or APU partitioned code streams, is designated as shared data, and will be given its own external symbol, MPU address and length, and APU address. The shared data is subsequently referenced by its own memory address when accessed in the local store 125 by the targeted modules stored in the local store 125 with the aid of the root module. Thus, a plurality of modules targeted for execution in the APU 120 can access shared data in the local store 125 without the necessity of the shared data being embedded within each targeted module. Accessing the shared data by a known memory address by both consecutive targeted modules saves data transmission bandwidth, time for data transfer, and so on. Typically, this is because the shared data only has to be transferred to the local store 125 once for all processing to be performed upon it, before sending the shared data back to the system memory.

Figure 2A:
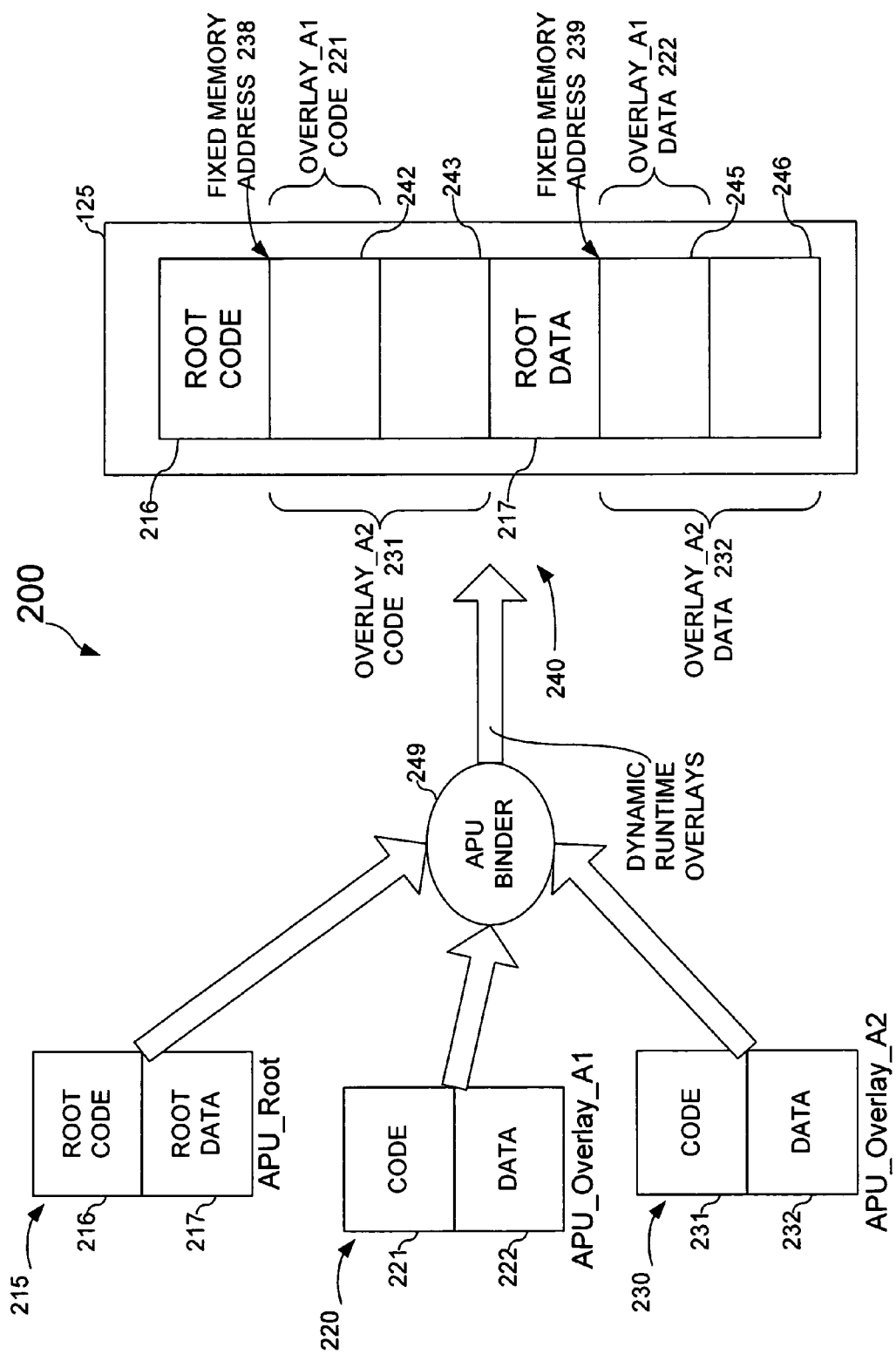
FIG. 2A illustrates a binding of APU modules and their overlays into a local store.

Turning now to FIG. 2A, illustrated is a binding diagram 200. In the binding diagram 200, disclosed are code and data modules that are partitioned from a single source program. In the binding diagram 200, there is illustrated a root module 215. The root module 215, APU_root, comprises those portions of code it has been deemed necessary to keep resident in the APU local store along with the data necessary for its execution, and referred to as root code and root data. There is a first overlay, APU_overlay_A1 220, and an APU_overlay_A2 230.

These overlays are then bound during the creating of an integrated executable by the APU binder 249. The APU binder 249 generates the necessary relocation information to permit the APU overlays, comprising code and data, to be transmitted between the system memory 160 and the local store 125. The (2 step) bind process uses information such as specific addresses wherein the overlays 220, 230 and the root code 215 reside in the system memory 160, the destination addresses of the overlay modules 220, 230 in the local store 125, and so on.

The partitioning of the overlay code and the overlay data can occur for distinct reasons. In the case of overlay code as illustrated in FIG. 2A, one reason can be that the code is too large to fit into the local store 125, and therefore is broken into smaller pieces.

When the integrated executable program executes, it transmits the root code 216, part of the root module 215, and the root data 217, also part of the root module 215, to the local store 125. The root code/data, 216, 217 are stored in a memory location of the local store 125, which has been determined at link time. Each partitioned component of the application has been modified to reflect the knowledge of these locations in such a way that the code and data will not be overwritten.

The root code 216 further comprises calls to system provided overlay management routines. Typically these overlay management routines provide a higher level interface to the data transfer function within the system. These overlay management routines will reside at a known fixed location in the APU local store 125, separate from the root code.

In the illustrated embodiment of FIG. 2A, when executing, the root code 216 first calls to overlay_A1 220. Overlay_A1 220 is transferred from the system memory 160 to the local store 125. Overlay_A1 code 221 is stored at memory location 238, and overlay_A1 data 222 is stored at APU memory location 239. The overlay_A1 code 221 is stored in memory range 242, and overlay_A1 data 222 is stored in memory range 245.

The overlay_A1 code 221 then executes. Once finished executing, control passes back to the root code 216. The root code 216 then calls to the overlay_A2 230.

In the illustrated embodiment of FIG. 2A, the overlay_A2 230 then overwrites ("overlays") the previously stored overlay_A1 220. The overlay_A2 code 231 also starts from the fixed memory address 238, and the overlay_A2 data 232 starts from the fixed memory address 239. Therefore, the overlay_A2 code 231 occupies the memory range 242, previously occupied by the overlay_A1 code 221. Similarly, the APU overlay_A2 data 232 occupies the memory range 245, previously occupied by the overlay_A1 data 222.

Furthermore, the overlay_A2 code 231 occupies a second memory range 243. The overlay_A2 data 232 occupies a second memory range 246 as well. In the illustrated embodiment of FIG. 2A, the code 231 and data 232 of the overlay_A2 230 are larger than the previous code 221 and data 222 sections. Therefore, the code 231 and data 232 sections occupy more space in the local store 125.

Figure 2B:
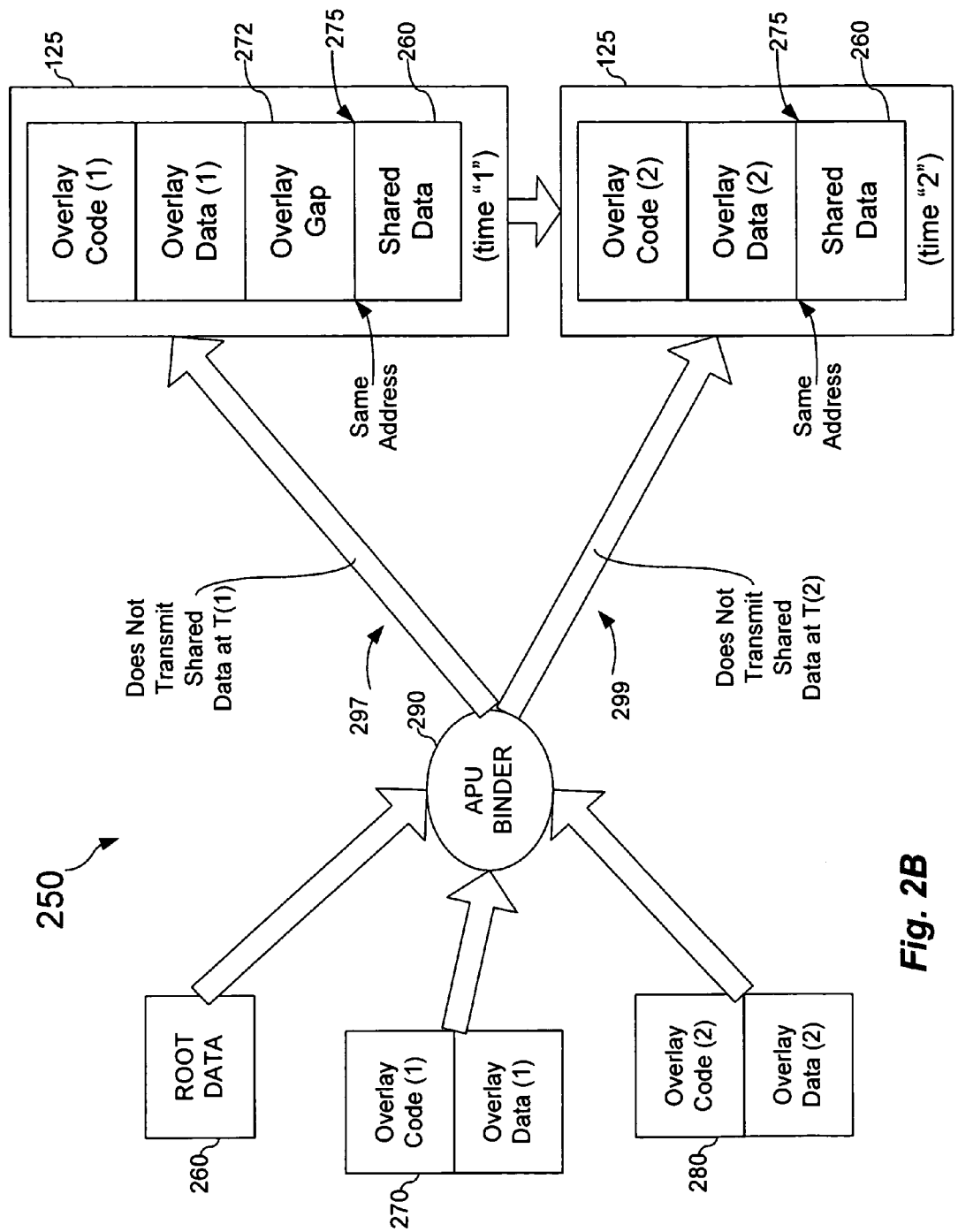
FIG. 2B illustrates time sequences of the overlay of code and data into a local store.

Turning now to FIG. 2B, illustrated is a second embodiment of the present invention, a pipeline diagram 250. The APUs 120 are employable to load data into the local store 125, and then load successive pieces of this code, thereby transforming the data. In other words, the data in a given local store is successively processed by overlain code. In one embodiment, the code and data are mapped to the same memory locations in the same local store 125.

In the pipeline diagram 250, there is illustrated a compiled module designated as shared data 260. Shared data 260 represents data that will be shared between multiple modules targeted for execution in the local store 125. There is further illustrated a first compiled module 270 (in one embodiment, a first overlay section), comprising code(1) and data(1) subsections, and a second compiled module 280 (in one embodiment, a second overlay section), comprising code(2) and data(2) subsections. Generally, the first and second compiled modules 270, 280 represent two APU modules which will be modified by the binder 290 to permit each one to access the common, or shared data 260 at a single location in the local store 125.

Although the code(1) and data(1) subsections were previously bound to one another to create the first module 220, and the code(2) and data(2) subsections were previously bound to one another to create the second module 230, both are to access the shared data 260. Therefore, the binder 290 binds the future memory address of the shared data 260 (that is, where it will be stored in the local store 125) to the first and second overlay sections 270, 280. In other words, every reference to any component of the shared memory, in either 270 or 280, will be modified to reference it at its "shared" location, as opposed to the location it would have occupied if each module had its own copy of the shared data.

After the address binding step is performed by the binder 290, the program comprising overlays is then in executable form. The shared data 260 is first transmitted into the local store 125. Then, the first function or overlay module 270 is transmitted into the local store 125 at time "1" in transmission 297. However, when the first overlay 270, comprising overlay code(1) and overlay data(1) is stored in the local store 125, there is also a gap 272. The gap 272 represents the limits of the largest size overlay that can be loaded into the local store 125 without overwriting the shared data 260, as described in FIG. 2A.

At time "2" in transmission 299, the shared data 210 is not transmitted. Instead, the shared data 210 is resident in the local store 125 from before time "1", and overlay code 280 is transmitted instead. At time "2", there is no gap in the local store 125 after the second module 280 is loaded, as the overlay module 280 occupies the available space in the local store 125. However, the root module ensures that the overlay module 280 does not overwrite the shared data 260. In a further embodiment, a compiler ensures that the modules 270, 280 are not bound together into a size that will necessitate the overwriting of the shared data 2610 if the bound modules 270, 280 are loaded to the local store 125. In a further embodiment, the compiler operates under direction of a programmer, through the insertion of programs, and so on.

Turning now to FIG. 3, illustrated is a method 300 for creating an integrated executable comprising overlay modules. Generally, method 300 is performed in the binder 290.

In step 310, source code for creating an integrated executable to run in the environment 300 is compiled. The source code can contain partition directives. That is, the source code contains instructions as to how the source code is to be broken up into the partitions, such as the overlay modules and the root modules. These partition directives can be with the guidance of a programmer, or calculated by the compiler directly.

In step 320, an object file is created which will remain resident in the local store 125 associated with an APU 120. This object file is the root module, such as the root module 215 of FIG. 2A. The root module stays resident, and is employable to initiate the transmissions of the overlays.

In step 330, two or more overlays are created, such as the APU_overlay_A1 220 and the APU_overlay_A2 230 of FIG. 2A. During runtime, these overlays will be sequentially transferred from the system memory 160 to the local store 125.

In step 340, an object file is created which is resident in the system memory 160 during the execution of the integrated executable. This resident portion has stored within it "images" of the overlays to be sent to the local store 125 during run time.

In step 345, the operating system of the method 300 provides overlay routines, "images" of which are stored in the system memory resident object file, and which can be invoked by the root module. Typically, executable copies of these overlay routines are to be transmitted to the local store 125 during run time before or along with the transmission of the root module 215.

In step 350, the overlay partitions and the root modules are bound to one another. In other words, object code that is targeted for execution on the various APUs 120 are linked together. In step 350, the root module 220 has calls inserted to the overlay management routines to control the overlays to be transmitted between the local store 125 and the system memory 160.

In step 360, the separate code and data segments of the overlays targeted for the same APU 120 are mapped to the same memory addresses 238 and 239. In step 370, the root module 215 and the overlays 220, 230 are given specific calls to overlay management routines. The root module is employable to effect information transmissions between a system memory and the attached processor unit. Typically, these routines are information transfer routines, such as MFC commands, packaged to provide an appropriate interface for partitioned code.

In step 380, the second step of the bind process is executed. Generally, this comprises the binding of the objects targeted for execution on the APUs 120 to the code targeted for execution on the system memory 160. The second binding process also inserts specific memory addresses other than the fixed memory addresses 238, 239 that allow data movement between the system memory 160 and the local store 125. In one embodiment, the second binding process also inserts a second set of relocation information associated with the one or more identified common shared data components into the root module, whereby the root module is employable to identify and adjust the memory boundaries of the two or more overlays.

In step 390, an integrated executable containing at least one root module, two overlay modules, and a module for execution within the shared memory 160 is created. Generally, the integrated executable is created by a linker that is able to resolve parameters and references between modules targeted for the local store 125 and the system memory 160.

Figure 4:
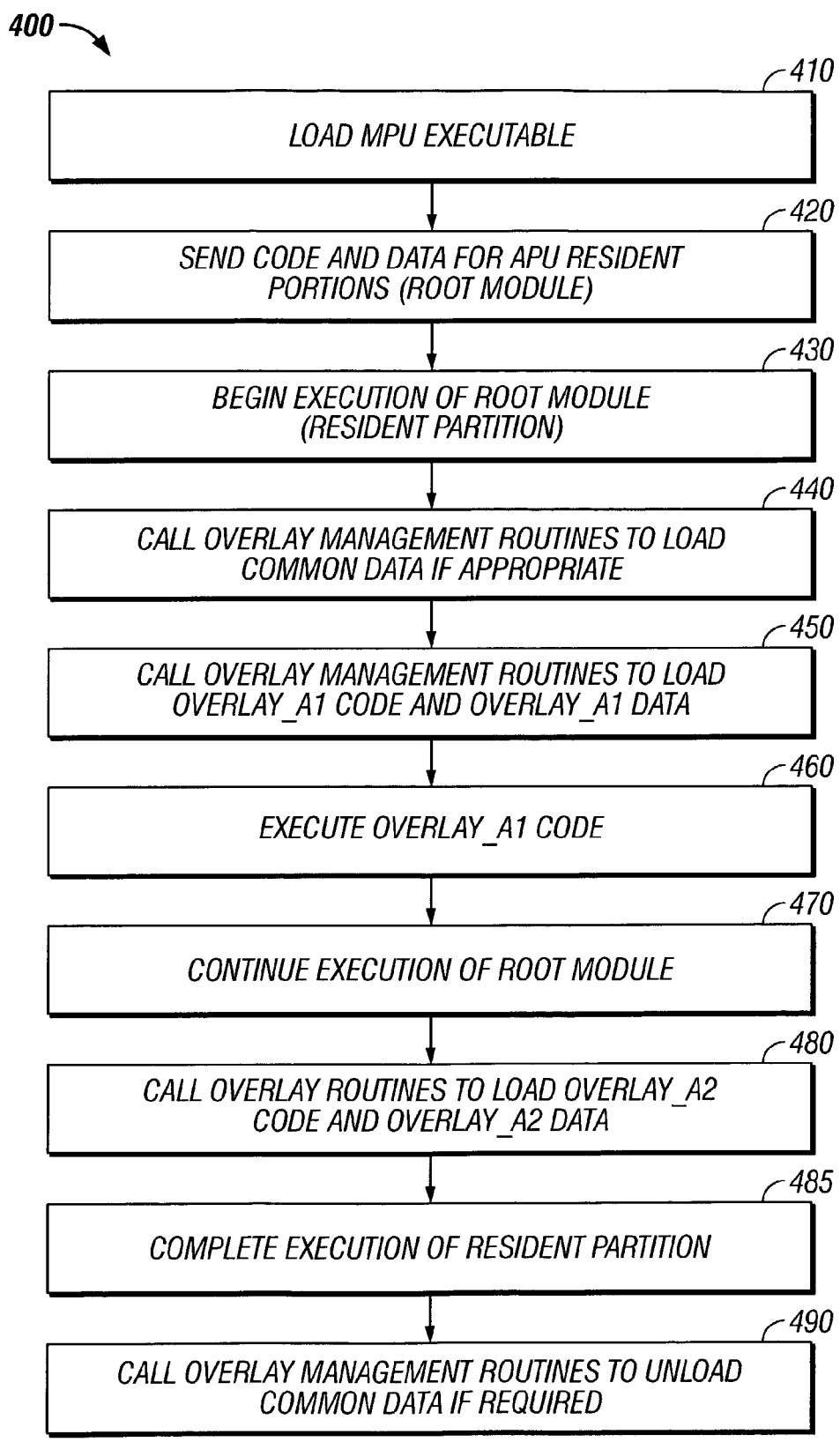
FIG. 4 illustrates a method for employing the integrated executable comprising a root module and overlay modules.

Turning now to FIG. 4, disclosed is a method 400 for executing an integrated executable comprising overlay modules and a root module. In step 410, the integrated executable is loaded to the system memory 160.

In step 420, the root module 215, comprising root code 216, calls to the overlay manager in the root code 216, and the overlay manager, are transmitted to the local store 125. In step 430, the execution of the root code 216 commences. The root code 216 executes until there is a need for the shared data 260. The root code 216 then continues to execute until there is a need for the code 221 or data 222. Then, in step 440, the root module calls to the overlay manager to load overlay code 221 and overlay data 222 into the fixed memory addresses 238, 239, respectively.

In step 460, the overlay_A1 code 221 executes until finished. Then, in step 470, the root module code 216 continues to execute until the overlay_A2 code 231 or overlay_A2 data 232 is required. In step 480, the root module code 216 calls the overlay manager to load overlay_A2 code 231 and overlay_A2 data 232. These are both loaded at the fixed memory addresses 238, 239, respectively, thereby overwriting the overlay code 221 and the overlay data 222.

In step 485, the overlay code 231 completes execution. Furthermore, the root code 216 has finished executing upon either the root data 217 or the overlay data 232. In step 490, the root module 215 calls the overlay manager to send processed data, either the root data 217, the overlay data 232, or both, back to the system memory 160.

Figure 5:
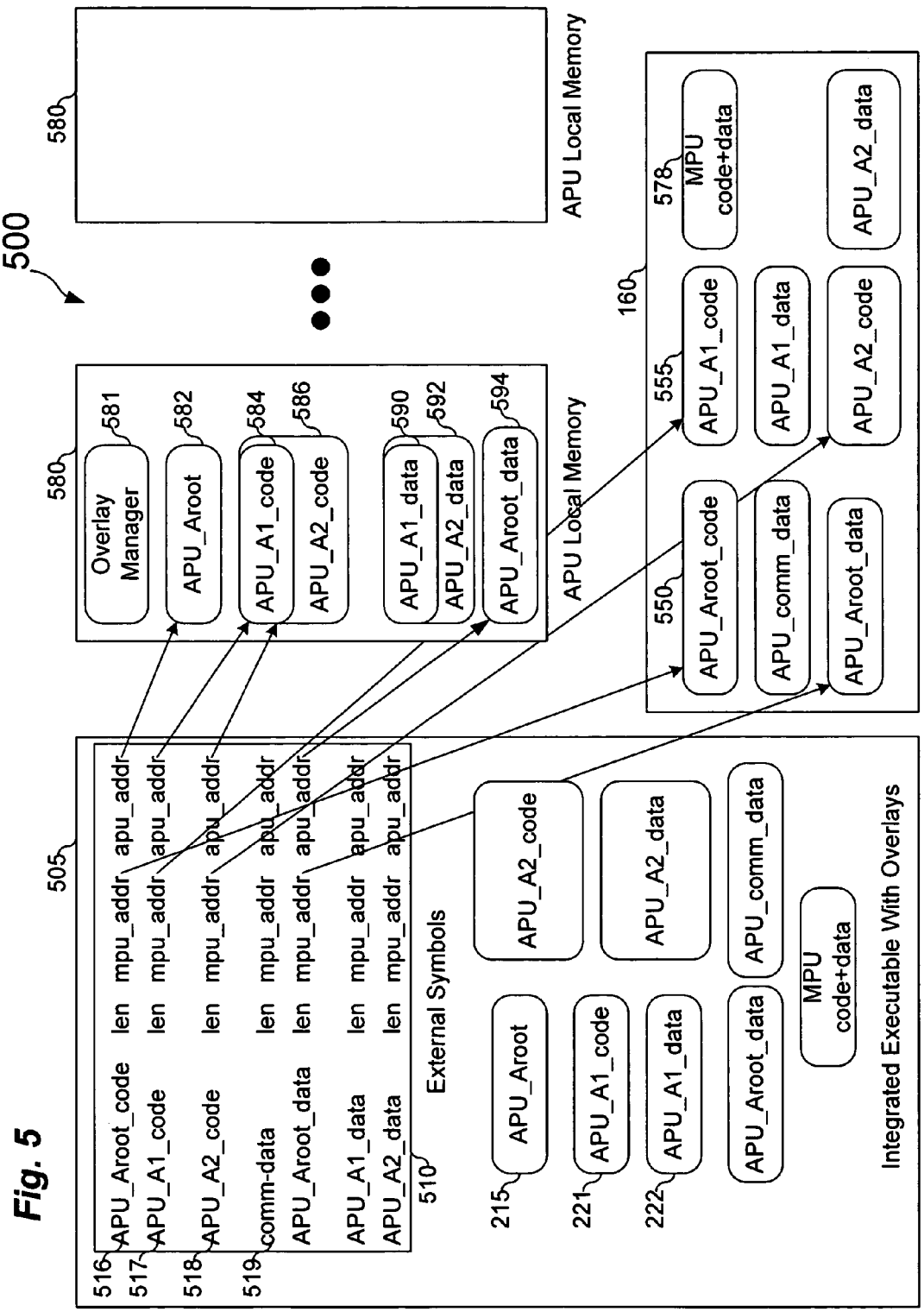
FIG. 5 depicts an overall system view of an integrated executable containing overlay and root modules.

Turning now to FIG. 5, schematically illustrated is one embodiment of the correspondences 500 between an integrated executable 505 comprising images of overlays and root modules, and the location of those overlays and root modules in the system memory 160 and the local store 125.

The executable 505 is a representation of a single executable as created by the two step bind process, such as illustrated in FIG. 4. The executable 505 is produced by a linker, wherein the linker is employable to create overlay partitions. The executable resides in system memory 160. Contained within the executable 505, in addition to the code and data to execute on the MPU 130, is the code and data to execute on the APU 120. The code and data destined for employment by the APU 120 is at execution time transmitted to the local store 125. In a further embodiment, the code and data is transmitted from the local store 125 to the system memory 160.

In FIG. 5, the integrated executable comprises an External Symbol Dictionary (EDS) 510. Generally, the EDS 510 is created during linking to allow separate modules, such as the overlay modules, the root modules, and the executable that is resident in the system memory 160, to transmit information between them. The EDS 510 comprises the name of the information to be transmitted, such as APU_Aroot_code 516, APU_A1_code 517, APU_A2_code 518, common data 519, and so on.

The EDS 510 further comprises the length ("len") of each module, and the address wherein the image of each module is to be stored in the system memory 160, the "MPU_addr." The EDS 510 further comprises the address wherein the image of each module is to be stored in the local store, the "APU_addr." Typically, for an overlay module, the "APU_addr" for overlay code corresponds to the fixed memory address 238, and the "APU_addr" for overlay data corresponds to the fixed memory address 239.

The integrated executable 505 further comprises copies of the individual bound modules that will be stored in the system memory 160. Some examples are the APU_Aroot module 215, the APU_A1_code 221, and the APU_A1_data 222.

The system memory 160 is also illustrated in FIG. 5. The system memory 160 contains images of the modules to be transmitted to the local store 125 within the integrated executable 505. Some examples of such modules are the APU_Aroot_code 550, the APU_A1_code 555, and so on. Furthermore, the system memory contains the MPU code and data 578. Generally, the MPU code and data 578 contains code that is not to be copied and sent to the local store 125.

FIG. 5 illustrates a local store 580. In the illustrated embodiment, the local store 580 has stored within it an overlay manager 581. Generally, the overlay manager 581 contains the routines to which root module code 582 calls. The resident root module comprises root module code 582 and root data 594. The local store 580 further comprises an APU_A1_code 584, which is overlain by an APU_A2_code 586. The local store 580 still further has APU_A1_data 590, which is overlain by APU_A2_data 592. Finally, there is APU_Aroot_data 594, which is not overlain by either data 590 or data 592.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for creating and employing overlays to operate in a heterogeneous Instruction Set Architecture, comprising:

separating information into at least two partitioned sections and at least one unpartitioned section;

targeting the at least one unpartitioned section to a first execution environment;

targeting a plurality of the at least two partitioned sections to a second execution environment;

wherein targeting comprises preparing code for execution in either the first or the second execution environment;

generating at least two overlay sections from at least one partitioned section of the at least one partitioned section;

pre-binding the plurality of partitioned sections to each other, wherein pre-binding comprises at least associating a particular data section of a plurality of data sections with a particular partitioned code section;

creating a root module, associated with both the pre-bound plurality of partitions and the overlay sections, employable to exchange the at least two overlay sections between the first and second execution environments;

binding the pre-bound plurality of partition sections to the at least one unpartitioned section; and creating an integrated executable.

2. The method of claim 1, wherein the step of binding further comprises resolving references of the pre-bound partitions.

3. The method of claim 1, further comprising employing the root module employable to swap the plurality of partitions between the first and second execution environment.

4. The method of claim 1, wherein the step of partitioning information further comprises partitioning code.

5. The method of claim 1, wherein the step of partitioning information further comprises partitioning data.

6. The method of claim 3, wherein the step of partitioning further comprises employing user-defined programs.

7. The method of claim 1, wherein the step of partitioning employs a compiler.

8. The method of claim 1, wherein the step of partitioning information further comprises generating a code partition employable to overlay a second code partition in the second execution environment.

9. The method of claim 1, wherein the binding further comprises inserting relocation information.

10. The method of claim 1, wherein the step of creating a root module occurs during a compilation.

11. The method of claim 1, wherein the step of creating a root module occurs after compilation.

12. The method of claim 1, wherein the step of creating a root module further comprises targeting the root module to an attached processor unit.

13. The method of claim 1, wherein the step of creating a root module further comprises inserting memory flow commands employable to affect a data transfer of the partitions between the first and second execution environments into the root module.

14. A method for generating and managing a root module in an attached processor unit of a heterogeneous computing environment comprising at least a first execution environment and a second execution environment, the method comprising:

creating two or more overlays from at least a part of two or more partitioned code sections;

creating the root module employable to control the execution of the two or more overlays in the attached processor unit, and the root module is further employable for execution in the attached processor unit, the attached processor unit operating in the second execution environment;

wherein the root module is further employable to effect a transfer of code from the first execution environment to the second execution environment;

identifying one or more common shared data components between the at least two or more overlays;

inserting a first set of relocation information associated with the one or more identified common shared data components into the root module, whereby the root module is employable to effect information transmissions between a system memory and the attached processor unit; and inserting a second set of relocation information associated with the one or more identified common shared data components into the root module, whereby the root module is employable to identify and adjust the memory boundaries of the two or more overlays.

15. The method of claim 14, wherein the overlay comprises a code overlay.

16. The method of claim 14, wherein the overlay comprises a data overlay.

17. The method of claim 14, further comprising a step of partitioning code sections, wherein the partitioning occurs through the guidance of a programmer.

18. The method of claim 14, further comprising a step of partitioning code sections, wherein the partitioning occurs through an employment of a compiler.

19. The method of claim 14, further comprising creating an integrated executable.

20. A method for employing overlay management in a heterogeneous computing system, the method comprising:
   transferring code from a first execution environment to a second execution environment;
   transferring shared data from the first execution environment to the second execution environment;
   processing the shared data in the second execution environment;
   overlaying the code in the second execution environment with other code from the first execution environment, but not overlaying the shared data with other data from the first execution environment; and
   processing the shared data in the second execution environment through employment of the overlaid new code.

21. The method of claim 20, wherein the step of transferring further comprising employing a memory address, wherein the memory address delimits the shared data.

22. The method of claim 20, wherein the step of transferring code from a first execution environment to a second execution environment employs a stub function.

23. The method of claim 20, further comprising transferring code from a main processor unit to a second execution environment.

24. The method of claim 20, further comprising transferring code from a first execution environment to an attached processor unit.

25. The method of claim 20, further comprising managing the overlaying of code through the employment of root module.

26. The method of claim 20, further comprising transferring non-shared data from a first execution environment to a second execution environment.

27. The method of claim 20, further comprising data processing the non-shared data.

28. The method of claim 20, further comprising overlaying the non-shared data in the second execution environment with other non-shared data from the first execution environment, but not overlaying the shared data with other data from the first execution environment.

29. The method of claim 20, further comprising modifying the shared data in the second execution environment by the code stored in the second execution environment.

30. The method of claim 20, wherein the step of processing the processed data in the second execution environment through employment of the overlaid new code comprises processing the shared data in a data pipeline.

31. The method of claim 20, wherein the shared data resides in the second execution unit for at least two loadings of a plurality of code.

32. The method of claim 20, wherein code comprising at least one library routine resides in the second execution environment for at least one overlaying of code.

33. A system having an overlay root module in a heterogeneous computing environment comprising at least a first execution environment and a second execution environment, the system comprising:
   A processor
   a local store;
   shared data, wherein the shared data is referenced by the plurality of overlay sections, and is stored in the local store;
   at least one overlay data transmission command;
   a system memory;
   a memory flow controller, wherein the memory flow controller is employable to be commanded by the at least one overlay data transmission command to transfer the plurality of overlay sections between the system memory and the local store; and
   the overlay root module configured to operate in the second execution environment, wherein the overlay root module is employable to load the plurality of the overlay sections from the system memory into the local store without overwriting the shared data.

34. The apparatus of claim 33, wherein the root module resides in the attached processor unit.

35. A computer program product for creating and employing overlays to operate in a heterogeneous Instruction Set Architecture, the computer program product having a medium with a computer program embodied thereon, the computer program comprising:
   computer code for separating information into at least two partitioned sections and at least one unpartitioned section;
   computer code for targeting the at least one unpartitioned section to a first execution environment;
   computer code for targeting a plurality of partitions to a second execution environment;
   wherein targeting comprises preparing code for execution in either the first or the second execution environment;
   computer code for generating at least two overlay sections from at least one partition section;
   computer code for pre-binding the plurality of partitioned sections to each other wherein pre-binding comprises at least associating a particular data section of a plurality of data sections with a particular partitioned code section;
   computer code for creating a root module, associated with both the pre-bound plurality of partitions and the overlay sections, employable to exchange the at least two overlay sections between the first and second execution environments;
   computer code for binding the pre-bound plurality of partition sections to the at least one unpartitioned section; and
   computer code for creating an integrated executable.

36. A processor for creating and employing overlays to operate in a heterogeneous Instruction Set Architecture, the processor including a computer program comprising:
   computer code for separating information into at least two partitioned sections and at least one unpartitioned section;
   computer code for targeting the at least one unpartitioned section to a first execution environment;
   computer code for targeting a plurality of partitions to a second execution environment;

wherein targeting comprises preparing code for execution in either the first or second execution environment;

computer code for generating at least two overlay sections from at least one partition section;

computer code for pre-binding the plurality of partitioned sections to each other, wherein pre-binding comprises at least associating a particular data section of a plurality of data sections with particular partitioned code section;

computer code for creating a root module, associated with both the pre-bound plurality of partitions and the overlay sections, employable to exchange the at least two overlay sections between the first and second execution environments;

computer code for binding the pre-bound plurality of partition sections to the at least one unpartitioned section; and computer code for creating an integrated executable.

* * * * *